June 22, 1926.
J. L. WENTZ
MECHANISM FOR POSITIONING TRUCK BODIES AND THE LIKE
Filed July 5, 1924
1,589,495
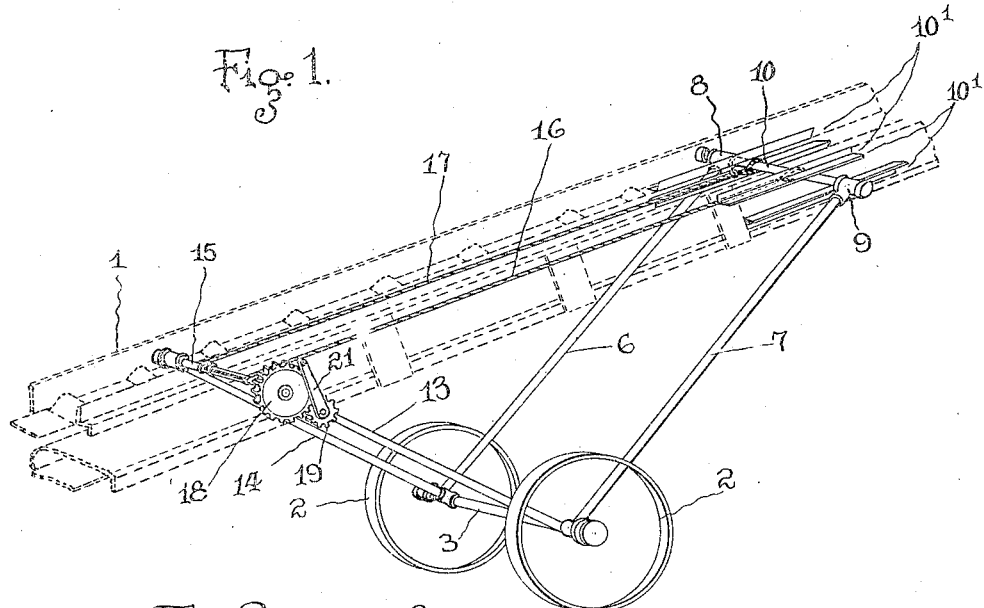
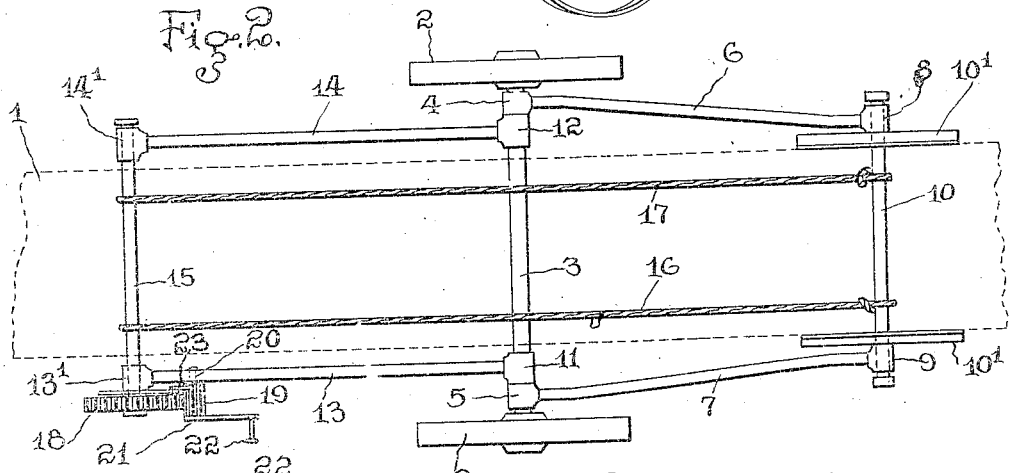
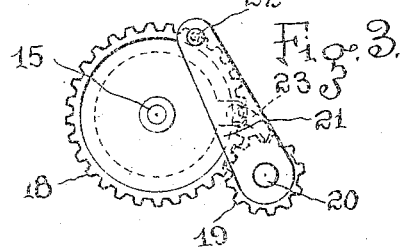
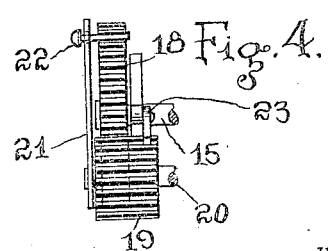
INVENTOR
Jere L. Wentz
BY
ATTORNEY Patented June 22, 1926.

1,589,495

UNITED STATES PATENT OFFICE.

JERE L. WENTZ, OF PASSAIC, NEW JERSEY.

MECHANISM FOR POSITIONING TRUCK BODIES AND THE LIKE.

Application filed July 5, 1924. Serial No. 724,301.

My invention relates to a new and useful mechanism for positioning truck bodies, carriers, skids and the like.

In devices of the character mentioned it is frequently desirable to adjust the height and position of the body of the device for more conveniently performing the work of loading or unloading and the object of my invention is to provide a simple and convenient means for making the desired adjustment and elevation.

I accomplish this object by the device illustrated in the accompanying drawings in which—

Figure 1 is a perspective view of the device as applied to a portable belt conveyor truck.

Figure 2 is a plan view of the same.

Figure 3 is a side view of a detail of the preferred form of my operating gear and locking lever.

Figure 4 is an end view of the same.

Similar characters of reference refer to similar parts throughout the several views.

In the drawings I have shown the device applied to a portable belt conveyor truck body 1 for the purpose of illustration but I do not intend to so limit my invention as it is apparent that my invention may be used to advantage with any form of device the inclination or adjustment of which it may be desirable to variably position, including conveyors, trucks, bodies and the like.

I have also shown the device mounted on traction wheels 2 but the traction wheels may be omitted if desired without departing from the spirit of my invention.

On shaft 3 which may be, if desired, the axle carrying the traction wheels 2, I provide a pair of rotatable collars 4, 5, to which are respectively secured struts 6 and 7 extending from the collars 4 and 5 to collars 8 and 9 on a shaft 10 slidably mounted between the runners $10^1$ adjacent the forward or delivery end of the truck body 1.

On the shaft 3 I also provide a pair of rotatable collars 11, 12 having struts 13 and 14 respectively extending therefrom to collars $13^1$, $14^1$ respectively on a rotatable shaft 15 mounted in the truck body adjacent the rear or receiving end of the truck body 1.

In belt conveyors, the body is ordinarily so balanced that it is inclined from the horizontal plane, and the higher end is usually the delivery end and the lower end the receiving end and I have so used these terms but it is apparent that the positions may be reversed or the body may be used in a horizontal position if desired.

On the shaft 10 I secure one or more winding cables 16, 17, which extend therefrom to the rotatable shaft 15 to which the cables are attached in any desired manner.

On the rotatable shaft 15 I provide a geared driving wheel 18. A loose pinion 19 engaging the gear 18 is provided on a shaft 20 which may be carried by the strut 13.

The pinion 19 may be operated by means of a crank 21 and handle 22. This handle 22 may, if desired, be loosely mounted in the crank 21 so that it may be extended for use as a hold for driving the pinion or it may be depressed and used for a locking means.

As the body 1 is supported by the struts 6, 7, 13, 14 it will be apparent that the elevation of the body 1 will be varied according to the degree of the angle formed by the two pairs of struts.

The length of the cables 16, 17 will be such that when fully extended the truck body will be at its lowest desired elevation.

When it is desired to elevate the truck body, the cables 16, 17 are wound on the shaft 15 by means of the handle 22, crank 21, pinion 19 and gear 18 until the desired elevation is attained, the handle 22 may then be depressed until it lies in the plane of the gear 18 and by engaging the gear 18 it will lock the pinion against rotation and securely fix the elevation of the device.

If desired, a dog 23 may be provided to engage and lock the pinion 19.

It will thus be seen that any variation in the elevation or inclination on the truck body 1 within the limits of the cable 16, 17 may be easily and conveniently attained.

Having thus described my invention, what I claim is:

1. In a device of the character described a body, parallel longitudinal slots in said body, parallel runners fastened along the edges of said slots, a shaft transverse of and slidable longitudinally along said slots on said runners, a second shaft journaled in said body, means to rotate said journaled shaft, a V-shaped frame the arms of which may be moved with relation to one another, the ends of said frame being rotatably connected one arm to each said shaft, and means connecting said shafts whereby their relation may be varied.

2. In a device of the character described, a body, a shaft, a frame of parallel V members journaled on said shaft at their apices and supporting said body, a second shaft journaled in the body and thru the end of one arm of said V, slots in the body having runners therealong, a third shaft journaled in said body and slidable longitudinally of said slots, said third shaft being also journaled in the end of the other arm of said V, and means connecting said second and third shafts whereby their relation to each other may be changed.

In testimony whereof, I, JERE L. WENTZ, have signed my name to this specification, this 28 day of June, 1924.

JERE L. WENTZ.